United States Patent [19]
Wiese et al.

[11] Patent Number: 5,808,245
[45] Date of Patent: Sep. 15, 1998

[54] VERTICAL MOUNT CATALYTIC CONVERTER MUFFLER

[75] Inventors: John S. Wiese, Lakeville; David E. Winnes, Bloomington, both of Minn.

[73] Assignee: Donaldson Company, Inc., Minneapolis, Minn.

[21] Appl. No.: 368,194

[22] Filed: Jan. 4, 1995

Related U.S. Application Data

[63] Continuation-in-part of Ser. No. 368,293, Jan. 3, 1995, abandoned.

[51] Int. Cl.⁶ .......................................................... F01N 1/00
[52] U.S. Cl. .............................. 181/255; 181/272; 60/299
[58] Field of Search ...................................... 181/227, 255, 181/258, 264, 269, 272, 273, 240; 60/299, 302

[56] References Cited

U.S. PATENT DOCUMENTS

| | | | |
|---|---|---|---|
| 677,357 | 7/1901 | Hyde | 181/264 |
| 2,363,236 | 11/1944 | Fluor | 181/264 |
| 2,721,619 | 10/1955 | Cheairs | 181/227 |
| 2,732,913 | 1/1956 | Higgins | 181/227 |
| 3,672,464 | 6/1972 | Rowley et al. . | |
| 4,368,799 | 1/1983 | Wagner . | |
| 4,580,657 | 4/1986 | Schmeichel et al. . | |
| 4,632,216 | 12/1986 | Wagner et al. . | |
| 4,969,537 | 11/1990 | Wagner et al. . | |
| 5,170,020 | 12/1992 | Kruger et al. | 181/227 X |
| 5,321,215 | 6/1994 | Kicinski | 181/227 X |
| 5,355,973 | 10/1994 | Wagner et al. . | |

*Primary Examiner*—Khanh Dang
*Attorney, Agent, or Firm*—Merchant, Gould, Smith, Edell, Welter & Schmidt, P.A.

[57] ABSTRACT

An vertical mount catalytic converter muffler for use on a combustion engine is provided. The vertical mount catalytic converter includes a muffler body having an exhaust inlet, an exhaust outlet and a sound attenuator; a catalytic converter arrangement positioned within the muffler arrangement between the exhaust inlet and the exhaust outlet; and a water collector and diverter arrangement positioned within the muffler body between the catalytic converter arrangement and the exhaust outlet. The water collector and diverter arrangement can include a funnel cup and conduit arrangement which collects water which enters through the exhaust outlet or which condenses in the muffler body, and diverts the collected water away from the catalytic converter. The vertical mount catalytic converter muffler can be assembled without using a leakproof weld.

17 Claims, 3 Drawing Sheets

VERTICAL MOUNT CATALYTIC CONVERTER MUFFLER

RELATED APPLICATION

This application is a continuation-in-part of application Ser. No. 08/368,293, filed Jan. 3, 1995, now abandoned, the entire disclosure of which is incorporated herein by reference.

FIELD OF THE INVENTION

The present invention relates to a vertical mount catalytic converter muffler for use on medium and heavy duty trucks, and more particularly to a vertical mount catalytic converter muffler having a water collector and diverter arrangement which protects the catalytic converter therein from water.

BACKGROUND OF THE INVENTION

The Environmental Protection Agency (EPA) has been regulating emissions from medium and heavy duty trucks. In order to comply with the new regulations, many truck manufacturers are providing catalytic converters on their trucks, particularly over-the-highway diesel engine trucks.

Catalytic converters have been widely utilized with internal combustion engines, typically gasoline powered engines, to reduce emissions of carbon monoxide and hydrocarbon. The catalytic converter utilizes a post combuster through which emissions from the internal combustion process are directed and oxidized. The catalyst promotes the conversion of carbon monoxides and hydrocarbons in the emissions to carbon dioxide and water vapor. In particular, the catalyst allows for the oxidation of hydrocarbons in the gaseous phase, thereby reducing the concentration of hydrocarbons in the exhaust stream. Due to the concentration reduction, a lower amount of hydrocarbons would be adsorbed onto the surface of carbonaceous particles or soot in the stream, resulting in a mass reduction in the tailpipe emissions.

In a typical application, the catalytic converter is located in the exhaust system as close to the exhaust engine manifold as practical. In this manner, advantage is taken of available heat in the exhaust gases to minimize the time lag in reaching the desired operating (reaction) temperature. The typical catalyst is a noble metal such as platinum or palladium.

A catalytic converter muffler for use on diesel engines has been developed. See U.S. Pat. No. 5,355,973 to Wagner et al. This design advantageously incorporates a catalytic converter arrangement into a muffler and provides an assembly having the same dimensions as a standard muffler. This is important since it allows a catalytic converter to be incorporated into truck without having to redesign the engine and exhaust system to specifically accommodate a catalytic converter.

Many over-highway trucks utilize a vertical mount muffler. Water from rainfall, road spray, or a vehicle washing cycle has a tendency to enter the tailpipe and eventually, the muffler. In addition, under certain conditions, water vapor from the engine exhaust can condense in the muffler and tailpipe. Generally, the presence of liquid water does not usually pose a significant problem for conventional mufflers. When a catalytic converter is incorporated into the muffler, however, liquid water can pose certain problems. In particular, exposure of the catalytic converter to water is not desirable because water has a tendency to adversely effect the catalyst, the substrate (core) on which the catalyst is applied, and the catalyst substrate mounting system. Accordingly, it is desirable to keep water away from the catalytic converter.

It has been proposed to utilize a rain cap mounted to the tailpipe to prevent outside water from entering the tailpipe and reaching the catalytic converter. While this design may be helpful in reducing the amount of outside water which contacts the contacts the catalytic converter, is not a viable option because its expected useful life it too short. It is estimated that the useful life of a rain cap would be shorter than the warranty life designated by the EPA. A rain cap would also suffer from being easily damaged since it is exposed to environment. In addition, a rain cap would be ineffective for keeping water condensing in the muffler and tailpipe from contacting the catalytic converter. Accordingly, it is desirable to provide a vertical mount catalytic converter muffler which protects the catalytic converter therein from outside water and which helps reduce the amount of water condensed from the exhaust stream from contacting the catalytic converter. In addition, it is desirable that the vertical mount catalytic converter muffler can be sized to replace conventional vertical mount mufflers without having to redesign an engine or exhaust system.

SUMMARY OF THE INVENTION

According to the present invention a vertical mount catalytic converter is provided for modifying an exhaust stream of an engine. Herein the phrase "vertical mount" in this context is meant to describe the position in which the catalytic converter muffler can be positioned in operation. The phrase is not intended to limit the applications of the catalytic convert muffler to operation in the vertical position only. As would be recognized by one of ordinary skill in the art, the catalytic converter muffler of the present invention is preferably positioned vertically, during operation, when attached to the exhaust stream of a combustion engine, such as a diesel engine for an over-the-highway truck. The term "modifying" in this context is meant to refer to the conduct of at least two basic operations with respect to the exhaust stream: sound attenuation (muffling); and, catalytic conversion (catalyzed combustion of hydrocarbons in the exhaust gas stream). In typical preferred applications the apparatus is utilized for the modification of an exhaust stream of a combustion engine for an over-the-highway truck. In most typical applications, the apparatus is utilized as a catalytic converter muffler for the diesel engine for an over-the-highway truck.

The preferred apparatus according to the present invention includes a muffler body, a catalytic converter arrangement, and a water collector and diverter arrangement. The muffler body generally has an exhaust inlet, an exhaust outlet, and a sound attenuator which provides for sound attenuation. That is, engine exhaust (also referred to as exhaust gas) is passed through the muffler body from the exhaust inlet and through to the exhaust outlet, with sound attenuation occurring within the muffler. The catalytic converter arrangement is positioned within the muffler body between the exhaust inlet and the exhaust outlet and provides for catalytic conversion. The water collector and diverter arrangement is positioned within the muffler body between the catalytic converter arrangement and the exhaust outlet. The water collector and diverter arrangement is constructed and arranged to collect water which enters through the exhaust outlet and divert collected water away from away from the catalytic converter arrangement.

In a preferred embodiment, the muffler body includes an inlet tube and an outlet tube. The inlet tube receives engine exhaust from the exhaust pipe or head pipe of a combustion engine, and distributes the exhaust evenly across the downstream surface of the catalytic converter. The outlet tube receives engine exhaust after it passes through the catalytic converter and conveys it out of the muffler body. Preferably, the outlet tube is connected to a tailpipe. Sound attenuation generally occurs within the muffler body.

A variety of arrangements may be utilized for sound attenuation. Among them are included arrangements utilizing one or more resonating chambers for sound attenuation, within the muffler. Resonating chambers may be positioned both upstream and downstream of the catalytic converter arrangement. In typical constructions, substantial use would be made of downstream resonating chambers (or other downstream acoustic elements) to achieve substantial sound attenuation.

The catalytic converter arrangement is preferably positioned within the muffler arrangement between the exhaust inlet and the exhaust outlet. In general it is operatively positioned such that as engine exhaust passes through the muffler body, it passes through the catalytic converter. Sound attenuation may occur before and/or after the engine exhaust passes through the catalytic converter. The catalytic converter is constructed and arranged such that in use it will effect a catalyzed conversion in the exhaust gas flow stream, i.e., oxidation of hydrocarbon components in the exhaust gas flow.

In selected arrangements according to the present invention the catalytic converter arrangement is operatively positioned between an exhaust inlet and downstream acoustics. The catalytic converter may comprise a metal foil core having an effective amount of catalyst dispersed thereon. In this context the term "effective amount" is meant to refer to sufficient catalyst to conduct whatever amount of conversion is intended under the operation of the assembly. The term "dispersed thereon" is meant to refer to the catalyst operably positioned on the catalytic converter core, regardless of the manner held in place.

When the catalytic converter arrangement is prepared from a metal foil core, generally the core can be corrugated foil coiled in an arrangement to form a porous tube having an outside surface. In preferred arrangements, the outer surface is generally cylindrical and an outer protective sheet, such as a metal sheet, may be positioned around the core outer cylindrical surface. Preferred metal foil cores have a cell density, i.e., population density of passageways therethrough, of between about 200 cells/in$^2$ and about 400 cells/in$^2$. Such an arrangement can be formed from corrugated stainless sheeting of about 0.0015 inches (0.001–0.003 inch thick).

A variety of catalysts may be utilized in assemblies according to the present invention, including platinum, palladium, rhodium, and vanadium.

In certain alternative embodiments, the catalytic converter core may be a porous ceramic core. A typical such core can be formed from extruded cordierite (a magnesia alumina silicate) and have an effective amount of catalyst dispersed thereon. Preferably, the cell density of passageways through such a ceramic core is between about 200 cells/in$^2$ and about 400 cells/in$^2$.

In preferred arrangements wherein the catalytic converter core is ceramic, the ceramic core is provided in a generally cylindrical configuration, with an outer cylindrical surface. The ceramic core is preferably protected by the catalytic converter arrangement being provided with a flexible, insulating mantle being wrapped around the core outer surface. The insulating mantle will preferably be secured in place by the positioning of an outer metal wrap therearound. In preferred arrangements, the outer metal wrap is provided with side flanges, operably folded over upstream and downstream faces of the catalytic converter core. Preferably a soft, flexible insulating rope gasket is positioned adjacent any such folds or flanges to inhibit crumbling of the ceramic core during the manufacture and installation process and to provide a seal for the less durable insulating mantle material.

In a preferred embodiment, the water collector and diverter arrangement is constructed and arranged to collect water which enters through the exhaust outlet and divert collected water outside the muffler body. Preferably, the water collector and diverter arrangement can additionally collect and divert water which condenses from the engine exhaust. More preferably, the water collector and diverter arrangement includes a funnel cup and a water conveying tube. The funnel cup can be attached, along its inside surface, to an end of the outlet tube of the muffler body. Alternatively, the funnel cup can be held in place by a bracket arrangement which can be connected to the muffler body and/or the catalytic converter arrangement. The water conveying tube is preferably connected to the muffler body and loosely attached to the funnel cup.

The funnel cup generally includes a wall constructed and arranged to collect water which enters the muffler body from the exhaust outlet. The wall can be integral with the funnel cup which means that it is one piece therewith, or it can be a separate piece, such as tubing, which can be connected to the funnel cup. Preferably, the wall is a cylindrical tube extending coaxially with the outlet tube. The wall length should be sufficient to prevent collected water from splashing out. The water collector and diverter arrangement can further include a drain and a tube for diverting water collected in the funnel cup to outside the muffler body.

An alternative preferred apparatus according to the present invention provides a vertical mount catalytic converter muffler including a muffler body having an exhaust inlet at a bottom thereof, an exhaust outlet at a top thereof, and a sound attenuator therein; a catalytic converter arrangement positioned within the muffler body between the exhaust inlet and the exhaust outlet; a funnel cup positioned within the muffler body below the exhaust outlet and above the catalytic converter arrangement, the funnel cup having a wall and a drain, the wall being constructed and arranged to collect water entering the muffler body through the exhaust outlet, and the drain being positioned for allowing collected water to drain therefrom via gravity; and a water conduit from the drain of the funnel cup to outside the muffler body.

In a preferred embodiment, the muffler body includes an inlet tube and an outlet tube. The inlet tube has a first end adapted for connection to an exhaust pipe of an engine and providing a passage through which engine exhaust flows prior to contact with the catalytic converter arrangement. It is desirable for the inlet tube to provide an even distribution of engine exhaust across the upstream surface of the catalytic convert. Accordingly, the inlet tube can be constructed and arranged to provide an even distribution of engine exhaust across the upstream surface of the catalytic converter. In one embodiment, the second end of the inlet tube can be capped and the inlet tube can contain out-flow perforations through which engine exhaust exits the inlet tube. The outlet tube provides a passage through which engine exhaust flows after exiting said catalytic converter arrangement. The outlet tube preferably has an end welded to an inner surface of the funnel cup. The weld between the end of the outlet tube and the inner surface of said funnel cup can be a tack weld. The outlet tube can have in-flow perforations through which engine exhaust enters the outlet tube.

DETAILED DESCRIPTION OF THE INVENTION

Figure 1:
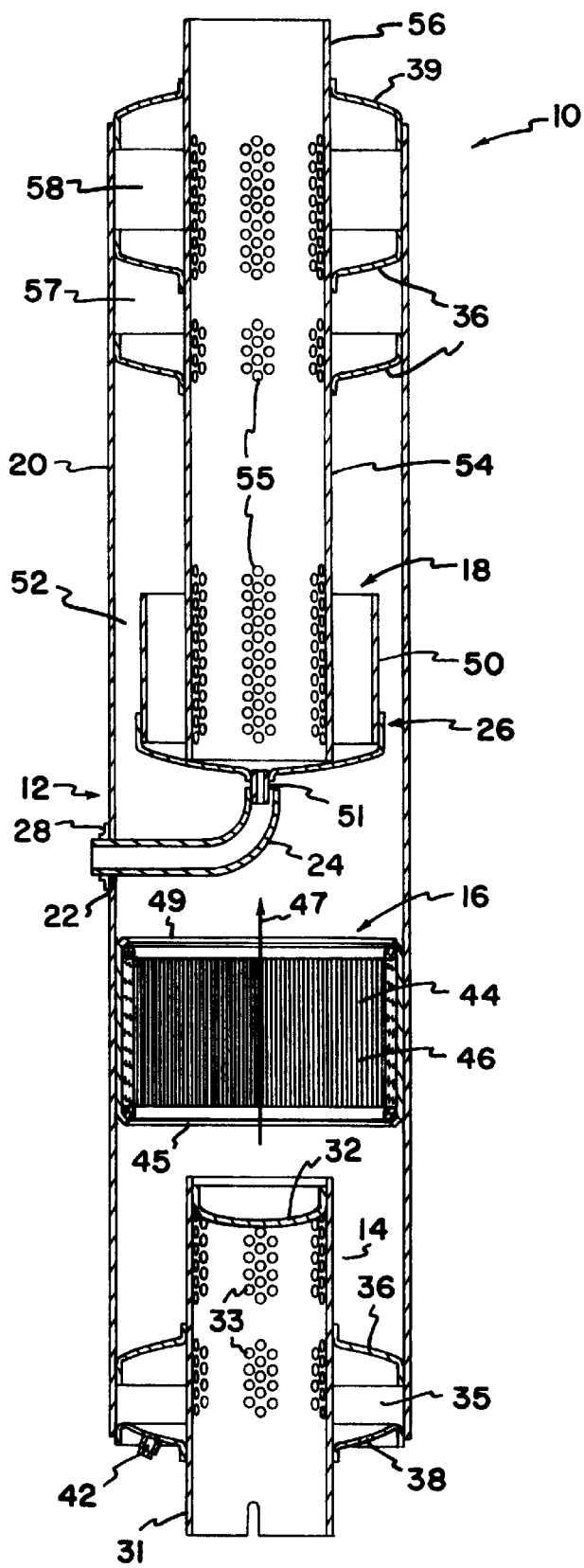
FIG. 1 is a schematic cross-sectional view of a vertical mount catalytic converter muffler assembly according to the principles of the present invention.

The preferred embodiment of the invention will be described in detail with reference to the drawings, wherein like reference numerals represent like parts and assemblies throughout the several views. Reference to the preferred embodiment does not limit the scope of the invention, which is limited only by the scope of the claims attached hereto.

The General Configuration of the Overall Assembly

Referring to FIG. 1, a vertical mount catalytic converter muffler is illustrated generally at 10, and may hereinafter be referred to as muffler assembly 10 for convenience. Four sub-assemblies are shown as components of muffler assembly 10. These sub-assemblies include outer tube or casing assembly 12, exhaust inlet assembly 14, catalytic converter assembly 16, and water collector and outlet exhaust assembly 18. In a preferred method of manufacturing muffler assembly 10, the sub-assemblies are first assembled, then combined coaxially and joined to provide constructed muffler assembly 10. Once outer tube or casing 12 is formed, the remaining sub-assemblies are joined thereto as will be described in more detail below.

Herein muffler assembly 10 is constructed with no cross seams, i.e., as a single longitudinal unit, and will be referred to as an "integrated" unit. A unit constructed in segments aligned coaxially and joined to one another along cross seams will be referred to as a "segmented" arrangement. It will be understood that to a great extent the principles of the present invention may be applied in either "integrated" or "segmented" units or arrangements. It is an advantage of the preferred embodiment of the present invention, however, that it is well adapted for arrangement as an "integrated" unit.

As will be understood from the following description, the muffler assembly according to the present invention is constructed to operate effectively and efficiently both as an exhaust noise muffler and as a catalytic converter. With respect to operation as an exhaust noise muffler, many of the principles of operation are found in, and can be derived from, certain known muffler constructions. With respect to these principles, attention is directed to U.S. Pat. Nos. 3,672,464; 4,368,799; 4,580,657; 4,632,216; 4,969,537; and 5,355,973, the disclosure of each being incorporated herein by reference.

Still referring to FIG. 1, muffler assembly 10 contains outer tube or casing assembly 12 formed from cylindrical shell 20 having a predetermined length and which is fabricated by rolling and welding sheet metal. The diameter and length of shell 20 are determined so that muffler assembly 10 is capable of fitting in its intended location. The shape of the shell can be altered, if desired, so that the muffler assembly can be adapted to fit a particular location. It is generally desirable for the overall dimensions of the muffler assembly to be close to the dimensions of prior mufflers not containing a catalytic converter therein. It is advantageous for the muffler assembly to be able to replace prior mufflers without needing to make alterations to the truck to fit the muffler assembly.

It is noted that the seam on shell 20 is not shown in FIG. 1. If desired, the shell can be prefabricated in the form of preformed tubing or piping having a desired diameter which need only be cut to a desired length. In a preferred embodiment, sheet metal can be rolled and welded which will provide a seam. As used herein, the words "weld" and "welding" are intended to describe a structurally sufficient connection made by welding. Unless indicated to the contrary, a weld should not be limited to a waterproof weld since it is an intention of this invention to provide a vertical mount catalytic converter muffler without the need for a waterproof weld or seal. Generally, a tack weld or point weld should be sufficient for connecting metal parts according to the present invention. A preferred weld which can be used in the preparation of the muffler assembly of the present invention is a full weld or full circumference weld. It is common for such a weld to have pin holes and, therefor, not be considered waterproof. Since the connections utilized by the present invention do not need to be waterproof or watertight, the time and expense required to prepare the muffler assembly of the present invention can be reduced. Although welding is, at times, a preferred means for structurally connecting or joining parts, particularly metal parts, it will be readily apparent that alternatives to welding which will provide desired structural support can be utilized, including soldering, adhering, riveting, etc.

Shell 20 includes aperture 22 through which water conveying tube 24 conveys water collected in funnel cup 26 to outside muffler assembly 10, as will be described in more detail below. Water conveying hose 24 is held in place by adaptor 28 which is attached to shell 20. As shown in FIG. 1, water conveying tube 24 forms about a 90 degree angle between aperture 20 and funnel cup 26. It may be desirable to increase the angle by adjusting the position of the aperture or the funnel cup. For example, it may be desirable to provide a large (obtuse) angle to ensure water easily flows through the tube.

Water conveying tube 24 can be connected to an outside tube which conducts the water to an appropriate drainage site such as under the truck. It is noted that water collected in funnel cup 26 can contain particulates and/or other soot from diesel engine exhaust which are normally found inside of a muffler. This water may be acidic and can cause discoloration and/or damage when contacted with the chrome or paint on a truck. Accordingly, it is generally desirable for the water collected in funnel cup 26 to be transported directly to a drainage site without contacting the chrome or paint on a truck. If desired, the outside tube and the water conveying tube can be formed of one continuous piece but, preferably, is formed of discrete tubes or conduits which can be connected together and allows for the location of the drainage site to be customized for each truck. The discrete tubes or conduits can be connected by a commonly known connection, such as by a threaded connection and/or by coupling.

Exhaust inlet assembly 14 is prepared from inlet tube 30 having mating tube 31 for attachment to an exhaust pipe or head pipe of an engine. Generally, mating tube 31 is intended to fit over an exhaust pipe or head pipe and held thereon by a band or clamp. Of course, any other means of attachment can be utilized to provide an adequate connection. For example, flanges can be provided on both the mating tube and the pipe from the engine which could be bolted or clamped together.

Inlet tube 30 is plugged at one end by plug 32. Engine exhaust is intended to flow from the exhaust pipe or head pipe into inlet tube 30, then through certain perforations 33. Once engine exhaust leaves exhaust inlet assembly 14, it flows downstream where it immediately contacts catalytic converter 44. Plug 32 is impermeable to engine exhaust and is intended to provide, when used in combination with out-flow perforations, an even distribution or flow of engine exhaust across catalytic converter 44. Alternative arrangements can be utilized. It is desirable, however, to provide a substantially even distribution of engine exhaust across the entire front or upstream surface 45 of catalytic converter 44. By providing a substantially even distribution of engine exhaust across the entire front or upstream surface 45 of catalytic converter 44, the lifetime of use of catalytic converter 44 is enhanced. Also, the more effective and even the distribution, the less likelihood of overload in any given portion of catalytic converter 44. This will facilitate utilization of a catalytic converter having a minimal or relatively minimal thickness, which is advantageous. By the term "substantially evenly" in this context it is meant that flow is distributed sufficiently to avoid substantial "dead" or "unused" volume in catalytic converter 44. Generally, as even a distribution as can be readily obtained, within acceptable back pressure limits is preferred.

If desirable for providing a more even distribution, the plug 32 can be made somewhat permeable to the flow of engine exhaust. In a preferred arrangement, the distribution element described in U.S. Pat. No. 5,355,973 can be utilized. Greater detail concerning achieving substantially evenly distributed flow across the catalytic converter is provided in U.S. Pat. No. 5,355,973, which is incorporated herein by reference.

For the embodiment shown in FIG. 1, inlet tube 30 is perforated along its length of extension within muffler assembly 10, i.e., that portion of inlet tube 30 positioned between end cap 38 and end cap 39, as indicated by perforations 33. Many of the perforations primarily allow gas expansion (and sound travel) into volume 35 assist in attenuation of sound to some degree. These perforations are referred to as acoustical perforations since their main purpose is in providing for sound attenuation. The remaining perforations below plug 32 are referred to as out-flow perforations because they allow the engine exhaust to flow out from the inlet tube 30. Regions such as volume 35 may be generally referred to as "resonating chambers" or "acoustics", and similar structure positioned upstream of catalytic converter assembly 16 and also constructed and arranged for sound attenuation, will be referred to herein as "upstream acoustics."

Baffle 36 and end cap 38 are welded to inlet tube 30, and end cap 38 is welded to shell 20. Baffle 36 is not welded to shell 20. Rather, an interference fit is provided between baffle 36 and shell 20 in order to account for thermal expansions which may occur within muffler assembly 10. Back pressure tap 42 is provided to measure back pressure during operation.

Engine exhaust flows from inlet assembly 14 downstream to catalytic converter assembly 16. Catalytic converter assembly 16 is positioned immediately downstream of inlet tube 30, and includes catalytic converter 44 having substrate 46 and catalyst appropriately positioned thereon. The substrate 46 is gas permeable, i.e., the exhaust gas passes therethrough along the direction of arrow 47. The catalytic converter 44 includes sufficient catalyst therein to effect the desired conversion in the exhaust gases as they pass therethrough. Herein this will be referred to as "an effective amount" of catalyst. The substrate 46 is sized appropriately for this. Greater detail concerning the preferred catalytic converter 44 is provided hereinbelow.

It is preferable that the flow of engine exhaust across catalytic converter 40 is substantially evenly distributed in order to increase the lifetime of use of the catalytic converter 44. Also, the more effective and even the distribution, the less likelihood of overload at any given portion of the catalytic converter 44. In general, the catalytic converter 44 provides for little or no sound attenuation within the muffler. Thus, the space utilized by the catalytic converter is space or volume of little or no beneficial effect with respect to muffler operation. Under such conditions, minimal thickness or flow path catalytic converter will be preferred, so as not to substantially inhibit muffler (attenuation) operation.

It has been determined that there is a preferred positioning of the catalytic converter 44 relative to plug 32, for advantageous operation. In particular, most preferred operation occurs when the catalytic converter 44 is not positioned too close to plug 32, but is also not positioned too far therefrom. A more detailed discussion of this feature can be found in U.S. Pat. No. 5,355,973.

Engine exhaust leaving catalytic converter 44 flows downstream and encounters water collector and outlet exhaust assembly 18. The engine exhaust flows around funnel cup 26 via gap 52 which is the area between funnel cup 26 and cylindrical shell 20. Since funnel cup 26 is generally circular and cylindrical, gap 52 is approximately even over the entire circumference of muffler assembly 10. Of course, if the funnel cup is held in place by a bracket or some other means which involves attachment to another part of the muffler assembly, then the engine exhaust would similarly need to flow therearound.

It is intended that the engine exhaust flows evenly over wall 50 and enters outlet tube 54 via perforations 55. Similar to inlet tube 30, outlet tube 54 contains two types of perforations 55, hereinafter referred to as in-flow perforations which allow engine exhaust to flow primarily into outlet tube 54, and acoustical perforations which provide primarily for sound attenuation by allowing sound waves to travel into resonating chambers 57 and 58.

Baffles 36 and end cap 39 are welded to outlet tube 54, and end cap 39 is welded to shell 20. Baffles 36 are not welded to shell 20. Rather, an interference fit is provided between baffles 36 and shell 20 in order to account for thermal expansion which may occur within muffler assembly 10.

Outlet tube 54 is equipped with tailpipe adaptor 56 which can be connected to a tailpipe. Generally, the connection is made using a band or similar clamp as would be known to one of skill in the art. Of course, other types of connections, such as those described with respect to the inlet tube, can be utilized. Since the purpose of the tailpipe is to direct the flow of the engine exhaust, it is not necessary to utilize a tailpipe if it is acceptable for the engine exhaust to exit muffler assembly 10 directly into the atmosphere.

Water entering outlet tube 54 from the tailpipe or, from the outside environment directly if there is no tailpipe, flows down along outlet tube 54 and is collected within funnel cup 26, and eventually drains through adaptor 51 and into water conveying tube 24. Similarly, water condensing from the engine exhaust and contacting outlet tube 54 would flow into funnel cup 26 and then out of muffler assembly 10 via adaptor 51 and water conveying tube 24.

The Construction of the Catalytic Converter

Figure 2:
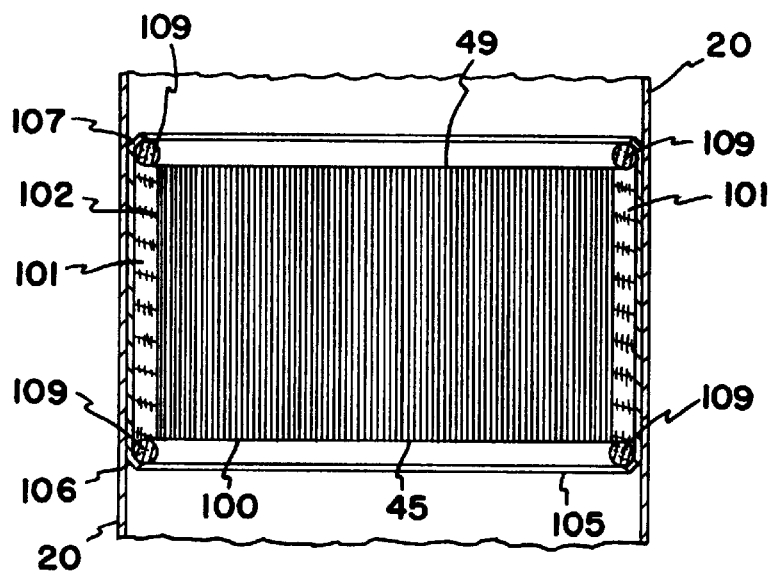
FIG. 2 is an enlarged, fragmentary view of a portion of the assembly shown in FIG. 1.

As indicated generally above, a variety of constructions may be utilized for the catalytic converter. One such construction is illustrated in FIGS. 1 and 2. An alternative construction is presented in FIGS. 3 and 4.

For the embodiment of FIGS. 1 and 2, the catalytic converter 44 includes a ceramic structure having a honeycomb-like configuration defining a plurality of longitudinal flow channels extending therethrough. Referring to FIG. 2, the ceramic construction is indicated generally at 100. For mounting within the muffler assembly 10, the ceramic core 100 is provided in a circular configuration, i.e., core 100 defines a cylindrically shaped item. Although alternate configurations are possible, the cylindrical one described and shown is advantageous for positioning within cylindrical shell 20.

A ceramic cylinder having a large plurality of longitudinal channels extending therethrough is a somewhat brittle configuration. It is therefor preferably mounted such that it will be dampened from the shocks and vibrations generally associated with a muffler assembly in a diesel powered vehicle. For the arrangement of FIGS. 1 and 2, the ceramic core 100 is provided with a dampening mantle or wrap 101 in extension around an outer periphery 102 thereof. The mantle 101 should be provided from a flexible, heat-resistant material, such as a vermiculite pad. The material Interam® Mat III, available from 3M, St. Paul, Minn. 55144 is usable. In general, for the arrangement shown the mantle 101 would be about 0.12 in. (0.3 cm) to 0.25 in. (0.64 cm) thick.

For the preferred embodiment the mantle 101 is retained against the core 100 by retaining means such as a cylindrical casing 105 of sheet metal. Preferably the casing 105 is provided not only in extension around the outside of the mantle 101, but also with a pair of side flanges bent toward the front face 45 and rear face 49, respectively, of the core 100 to contain the mantle 101. That is, casing 105 has first and second side lips or rims 106 and 107 folded toward opposite sides of the core 100. Preferably a circular loop of rope or O-shaped gasket 109 is provided underneath each of the rims 106 and 107, to facilitate secure containment of the core 100 and mantle 101 within the casing 105, without damage.

Referring to FIGS. 1 and 2, it will be understood that the preferred catalytic converter 44 illustrated is a self-contained or "canned" unit, positioned within shell 20. The converter comprises a ceramic core 100 positioned within a casing 105, and protected therein by the mantle 101 and rope rings 109. The converter 50 can thus be readily welded or otherwise secured and placed within shell 20, with good protection of the core 100 from extreme vibrations within the muffler assembly 10. In addition, the mantle 101 and rings 109 will help protect the converter 44 from premature deterioration due to flow erosion.

In a typical system, it is foreseen that the ceramic core 100 will comprise an alumina magnesia silica (crystalline) ceramic, such as cordierite, extruded from a clay, dried and fired to a crystalline construction. Techniques for accomplishing this are know in the ceramic arts. In many, crystalline ceramics are prepared as catalytic converter cores by application of a wash coat thereto and then by dipping the core into a solution of catalyst. In some, the wash coat and catalyst are applied simultaneously. Typical catalysts utilized would be noble or precious metal catalysts, including for example platinum, palladium or rhodium. Other materials such as vanadium have also been used in catalytic converters.

In general, for use within a diesel engine muffler assembly, it is foreseen that the core 100 should be extruded with a cell density of longitudinal passageways of 200 cells/in$^2$ to 600 cells/in$^2$ and preferably between 200 cells/in$^2$ and 400 cells/in$^2$ (square inch of front surface area). In many applications, the cell density will be about 300 cells/in$^2$.

As indicated above, alternate constructions for the catalytic converter may be utilized. One such alternate construction would be to construct the core from a metallic foil substrate, rather than a ceramic. This will be understood by reference to FIGS. 3 and 4.

Figure 3:
FIG. 3 is a fragmentary view of a substrate from which certain catalytic converters utilizable in muffler assemblies according to the present invention may be prepared.
Figure 4:
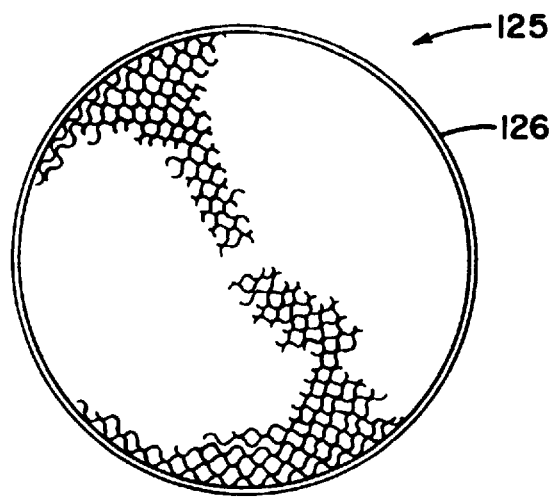
FIG. 4 is an end view of a catalytic converter prepared utilizing a substrate similar to that shown in FIG. 3, the catalytic converter of FIG. 4 being usable in an assembly such as that shown in FIG. 1.

In FIG. 3, a side or edge view of a corrugated metal substrate 120 usable to provide a catalytic converter is shown in general. A substrate 120 should comprise a relatively thin metal such as a 0.001–0.003 inch (0.003–0.005 cm) thick sheet of stainless steel that has been corrugated to make wells of a size such that when coiled around itself, as indicated in FIG. 4, about 200 cells/in$^2$ to 600 cells/in$^2$ and preferably between about 200 cells/in$^2$ and 400 cells/in$^2$. In a general application, the cell density will be about 300 cells/in$^2$. Thus, referring to FIG. 4, the catalytic converter 125 depicted comprises a sheet of material, such as that illustrated in FIG. 3, which has been coiled upon itself and braised to retain the cylindrical configuration. Since the construction is not brittle, but rather is formed from sheet metal, a mounting mantle is not needed around the outside of the construction, for protection from vibration. The coil or construction may be surrounded with an outer casing 126 if desired, and then mounted within a muffler assembly such as that shown in FIG. 1, similarly to catalytic converter 44. It is foreseen that in general the catalyst can be applied to the metal substrate 120 in a manner similar to that for the substrate, i.e., by use of a wash coat followed by dipping in a catalyst.

In general, catalyst activity is a function of temperature. That is, a catalytic converter generally operates best when it is hottest (within design limits). Thus, since the inlet and the bay muffler assembly is hotter than the outlet end, it is generally preferable to position the catalytic converter toward the inlet end of the arrangement to the extent possible.

Also, in general the catalytic converter takes up space in the muffler assembly otherwise utilizable for low frequency sound attenuation. Since the catalytic converter does not facilitate sound attenuation and since sound attenuation will not generally take place in the space occupied by the catalytic converter, a problem with the catalytic converter positioning is that it interferes with sound attenuation. It is desirable, therefore, to render the catalytic converter as short as reasonably possible. This is facilitated by assuring good flow distribution across the front surface of the catalytic converter, and also by positioning the catalytic converter where it will operate at the hottest, and thus most efficient.

To improve efficiency, and thus shorten the length of core needed, it is also preferred that the population density of pores through the core be as high as reasonably obtainable. Thus, high porosity (with a large population of very small pores) is generally preferred.

As indicated generally above, it is preferred that the catalytic converter be integrated with the muffler assembly, i.e., positioned therein, rather than positioned simply in a flow stream in series with a muffler assembly. The reasons for this include that it is foreseen that less overall back pressure will be generated by such a system.

Alternate Arrangement Of The Muffler Assembly

As indicated generally above, it is foreseen that alternate construction and configuration for the funnel cup may be utilized in assemblies according to the present invention. A preferred alternate construction is shown by FIG. 5.

Figure 5:
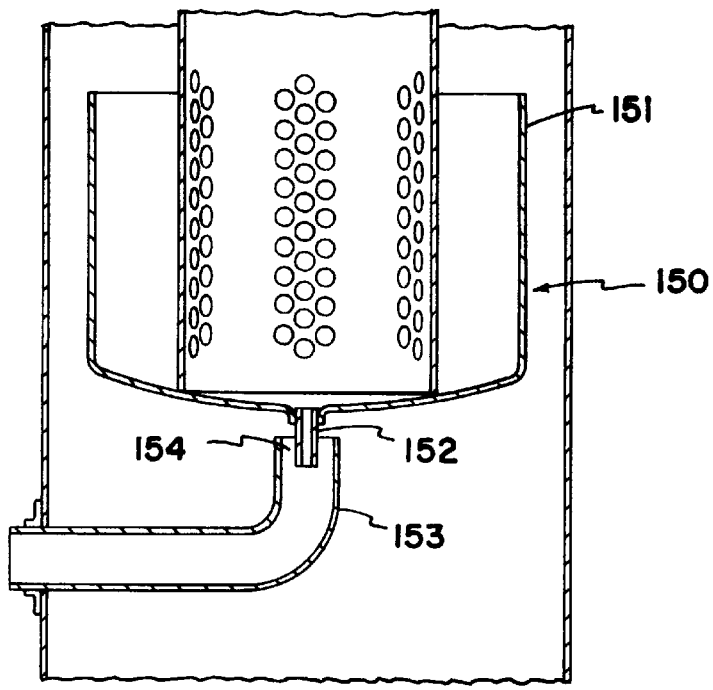
FIG. 5 is a fragmentary cross-sectional view showing an alternative funnel cup.

Referring to FIG. 5, a fragmentary view of a funnel cup 150 which can be used in the vertical mount catalytic converter muffler of the present invention is shown. Funnel cup 150 is in many ways analogous to that illustrated and depicted by reference numeral 26 in FIG. 1. Funnel cup 150 includes wall 151 which is integral therewith. Use of the word "integral" herein indicates that funnel cup 150 is a one-piece construction which includes wall 151.

The relationship between funnel cup 150, adaptor 152 and water conveying tube 153 is better illustrated in FIG. 5 because it is enlarged. As shown in FIG. 5, it is a feature of the present invention that adaptor 52 is disposed within water conveying tube 153 and provides gap 154. Adaptor 152 can be welded to funnel cup 150, but the weld can be porous since water which flows along the outside surface of adaptor 152 will enter tube 153 via gap 154. It is preferred that adaptor 152 extend into or overlaps tube 153 in order to ensure that they remain in position.

The material which is preferred for the construction of the vertical mount catalytic converter muffler is stainless steel because of its long expected life, especially compared with mild steel or carbon steel. It is important that the muffler assembly have a life expectancy at least as long as the warranty period required by the EPA (as applied to engines). Particularly preferred metals for use in all parts of the muffler assembly except the water conveying tube include type 409 stainless steel and aluminized type 409 stainless steel. It is preferred that the water conveying tube be made of type 304L stainless steel, as it is readily available. Generally, it is preferred that the metal parts used in constructing the muffler assembly have a thickness of about 0.046 inch (18 gauge). Of course, alternative thickness metals can be used without departing from the scope of the invention.

The dimensions of the muffler assembly is preferably about 10 inches (diameter) by about 45 inches (length) or about 11 inches (diameter) by about 36 inches (length), since theses are standard muffler sizes. Of course, as would be recognized by one skilled in the art, the shell can be manufactured to have almost any dimension which would allow it to fit into its intended location. It is generally desirable for the overall dimensions of the muffler assembly to be close to the dimensions of prior mufflers not containing a catalytic converter therein. It is advantageous for the muffler assembly to be able to replace prior mufflers without needing to make alterations to the truck to fit the muffler assembly.

As discussed above, the water conveying tube 24 is preferably a type 304L stainless steel tube, and has a 1.0 inch (16 gauge) outer diameter, and more preferably a 0.75 inch outer diameter. Adaptor 49 preferably is made of 0.50 inch outer diameter type 304 stainless steel. When adaptor 51 and tube 24 are joined, there is preferably about a 0.50 inch overlap. The overlap can be greater if desired to further ensure a connection. Preferably, adaptor 28, which holds tube 24 in place, is welded to shell 20. It may be desirable for the weld to be a full circumference weld to prevent leakage out of muffler assembly 10.

The muffler assembly is preferably constructed by assembling all the sub-assemblies, then introducing the sub-assemblies into the cylindrical shell. The process preferably involves connecting water collector and outlet exhaust assembly 18 with outer tube or casing assembly 12. Water conveying tube 24 should be displaced around adaptor 51, then end cap 39 should be welded to cylindrical shell 20. Then catalytic converter assembly 16 can then be introduced into outer tube or casing assembly 12 and welded therein. Exhaust inlet assembly 14 can then be inserted into outer tube or casing assembly 12 and end cap 38 welded to cylindrical shell 20. Muffler assembly 10 is preferably sealed sufficiently to prevent an undesirable amount of engine exhaust from escaping therefrom other than as intended.

While the invention has been described in conjunction with a specific embodiment thereof, it is evident that different alternatives, modifications, variations, and uses will be apparent to those skilled in the art in view of the foregoing description. Accordingly, the invention is not limited to these embodiments or the use of elements having specific configurations and shapes as presented herein.

What is claimed is:

1. A vertical mount catalytic converter muffler comprising:
   (a) a muffler body having an exhaust inlet, an exhaust outlet and a sound attenuator therebetween, wherein exhaust gas can pass through the muffler body from the exhaust inlet and through the exhaust outlet with sound attenuation occurring within the muffler body;
   (b) a catalytic converter arrangement positioned within said muffler body between the exhaust inlet and the exhaust outlet; and
   (c) a water collector and diverter arrangement positioned within said muffler body between said catalytic converter arrangement and the exhaust outlet, said water collector and diverter arrangement comprising a funnel cup having a generally cylindrical wall extending coaxially with the muffler body to form a gap between the wall, said water collector and diverter arrangement collects water which enters through the exhaust outlet and diverts collected water away from said catalytic converter arrangement.

2. The vertical mount catalytic converter muffler according to claim 1 wherein said water collector and diverter arrangement is constructed and arranged to collect water which enters through the exhaust outlet and divert collected water outside said muffler body.

3. The vertical mount catalytic converter muffler according to claim 2 comprising an outlet tube within said muffler body, said outlet tube having a first end and a second end, the first end of the outlet tube forms the exhaust outlet, and the second end of the outlet tube is connected to said water collector and diverter arrangement.

4. The vertical mount catalytic converter muffler according to claim 3 wherein said water collector and diverter arrangement comprises a funnel cup having an inside surface welded to the second end of the outlet tube, and a wall constructed and arranged to collect water which enters from the exhaust outlet.

5. The vertical mount catalytic converter muffler according to claim 4 wherein said water collector and diverter arrangement further comprises a drain in the funnel cup for draining collected water, and a tube for diverting water from the drain to outside said muffler body.

6. The vertical mount catalytic converter muffler according to claim 1, wherein said water collector and diverter arrangement comprises a funnel cup having a wall integral therewith having sufficient length to prevent water collected therein from splashing out, a drain in the funnel cup for allowing collected water to drain therefrom, and a tube for diverting water from the drain to outside said muffler body.

7. The vertical mount catalytic converter according to claim 1, wherein said catalytic converter arrangement comprises a metal foil core having an effective amount of catalyst dispersed thereon.

8. The vertical mount catalytic converter according to claim 1, wherein said catalytic converter arrangement comprises a ceramic core having an effective amount of catalyst dispersed thereon.

9. The vertical mount catalytic converter according to claim 8, wherein said catalytic converter arrangement includes an insulation mantle wrapped around said ceramic core.

10. The vertical mount catalytic converter according to claim 1, wherein the gap between the wall and the muffler body allows exhaust gas to flow therethrough.

11. A vertical mount catalytic converter muffler comprising:
  (a) a muffler body having an exhaust inlet at a bottom thereof, an exhaust outlet at a top thereof, and a sound attenuator therein;
  (b) a catalytic converter arrangement positioned within said muffler body between the exhaust inlet and the exhaust outlet;
  (c) a funnel cup positioned within said muffler body below the exhaust outlet and above said catalytic converter arrangement, said funnel cup comprising a wall and a drain, the wall being constructed and arranged to collect water entering said muffler body through the exhaust outlet, and the drain being positioned for allowing collected water to drain therefrom via gravity; and
  (d) a water conduit from the drain of said funnel cup to outside said muffler body.

12. The vertical mount catalytic converter muffler according to claim 11, wherein said muffler body further comprises an inlet tube and an outlet tube,
  the inlet tube having a first end adapted for connection to an exhaust pipe of an engine and providing a passage through which engine exhaust flows prior to contact with said catalytic converter arrangement, and having a capped second end and out-flow perforations through which engine exhaust exits the inlet tube, and
  the outlet tube providing a passage through which engine exhaust flows after exiting said catalytic converter arrangement.

13. The vertical mount catalytic converter muffler according to claim 12, wherein the outlet tube has a first end through which exhaust exits said muffler body, and a second end welded to an inner surface of said funnel cup.

14. The vertical mount catalytic converter muffler according to claim 13, wherein the weld between the second end of the outlet tube and the inner surface of said funnel cup is a tack weld.

15. The vertical mount catalytic converter muffler according to claim 13, wherein the outlet tube has in-flow perforations through which engine exhaust enters the outlet tube.

16. The vertical mount catalytic converter muffler according to claim 11, wherein the wall of said funnel cup is integral with said funnel cup.

17. The vertical mount catalytic converter muffler according to claim 11, wherein the muffler body includes an outlet tube having a first end through which exhaust exits said muffler body, and a second end welded to an inner surface of said funnel cup, and wherein the wall of said funnel cup is a cylindrical tube extending coaxially around the outlet tube.

* * * * *

UNITED STATES PATENT AND TRADEMARK OFFICE
CERTIFICATE OF CORRECTION

PATENT NO. : 5,808,245

DATED : SEPTEMBER 15, 1998

INVENTOR(S) : WIESE ET AL.

It is certified that error appears in the above-identified patent and that said Letters Patent is hereby corrected as shown below:

Col. 6, line 44: "90" should read —90— (no bold)

Col. 11, line 34: both occurrences of "409" should read —409— (no bold)

Col. 11, line 36: "304L" should read —304L— (no bold)

Col. 11, line 56: "304L" should read —304L— (no bold)

Col. 11, line 59: "304" should read —304— (no bold)

Signed and Sealed this

Thirtieth Day of May, 2000

Q. TODD DICKINSON

*Attest:*

*Attesting Officer*      *Director of Patents and Trademarks*